Sept. 27, 1949.   L. P. GAUCHER   2,483,132
CONVERSION OF HYDROCARBON GAS INTO
CARBON MONOXIDE AND HYDROGEN
Filed Feb. 21, 1946
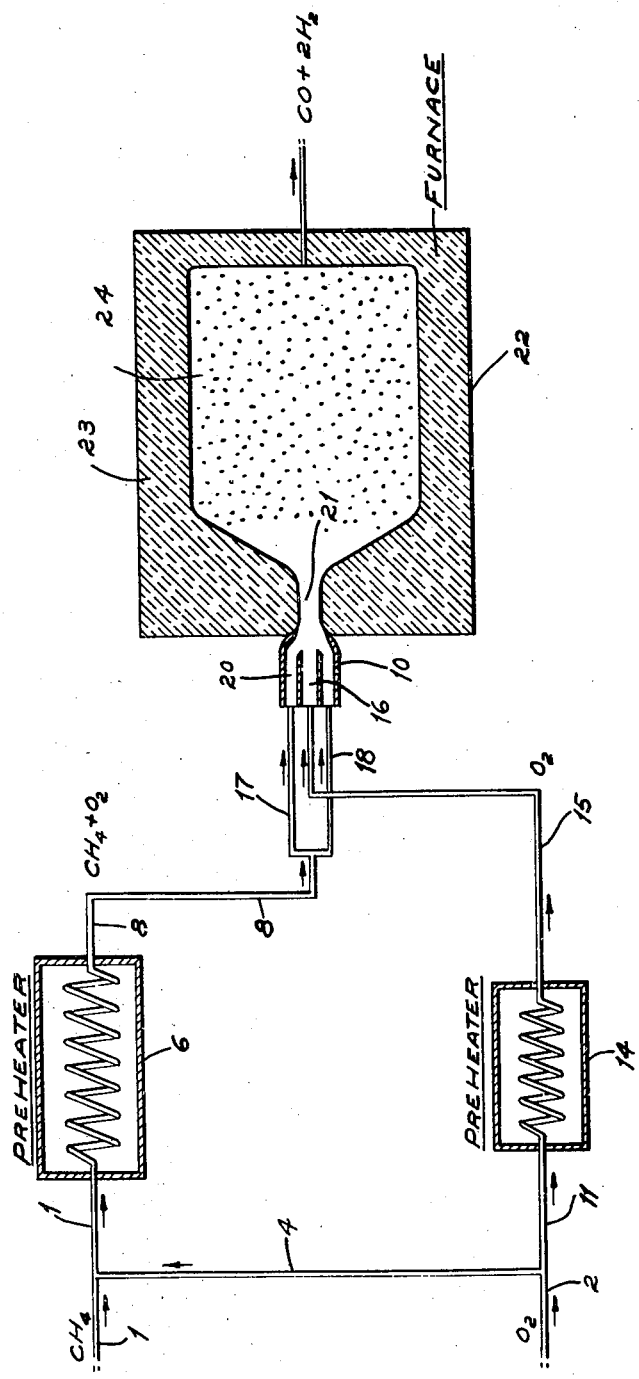
INVENTOR
LEON P. GAUCHER
BY   HIS ATTORNEY Patented Sept. 27, 1949

2,483,132

UNITED STATES PATENT OFFICE 2,483,132

CONVERSION OF HYDROCARBON GAS INTO CARBON MONOXIDE AND HYDROGEN

Leon P. Gaucher, Mount Vernon, N. Y., assignor to The Texas Company, New York, N. Y., a corporation of Delaware Application February 21, 1946, Serial No. 649,291

15 Claims. (Cl. 48—196)

This invention relates to a method of preparing a synthesis gas comprising carbon monoxide and hydrogen by the combustion of a hydrocarbon gas with a limited quantity of a gas rich in molecular oxygen.

The invention contemplates dividing a gas rich in molecular oxygen into major and minor streams. The major stream is combined with a hydrocarbon gas and is passed through a preheater wherein the mixture of hydrocarbon gas and major stream of oxygen is raised to a desired temperature. The mixture of hydrocarbon gas and major stream of oxygen is passed through the preheater at such a rate that turbulent flow is effected, thereby assuring a thorough mixing of the components. The minor stream of oxygen is passed to a separate preheater wherein it is raised to a desired temperature. The minor stream of oxygen and the mixture of oxygen and hydrocarbon gas are introduced into a combustion zone in separate streams in a manner so as to effect mixing of the two streams upon their entry into the combustion zone. In the combustion zone, there is effected conversion of the hydrocarbon gas with the limited quantity of oxygen into a mixture containing mainly carbon monoxide and hydrogen in the ratio of one mol of carbon monoxide to about 2 mols of hydrogen.

The method of the invention is adaptable to conversions of a hydrocarbon gas with a limited quantity of oxygen into products comprising mainly carbon monoxide and hydrogen wherein the oxygen content of the total conversion mixture comprises 33 to 40% of the total reactants. Expressed another way, the invention covers the partial combustion of methane wherein a half mol to two-thirds mol of oxygen is reacted with one mol of methane. Relating this to complete combustion of a hydrocarbon gas such as methane with oxygen which requires two mols of oxygen to every mol of methane, it is seen that the invention is applicable to the partial combustion of methane where the oxygen content varies between 25 to 33 per cent of that required for total combustion.

The oxygen to be used in the partial combustion is divided into a major stream which comprises about 55 to 85% of the total oxygen while the minor stream constitutes from 15 to 45% of the total oxygen supplied. Preferentially the division is effected so that the major stream constitutes from about 60 to 75% of the total oxygen and the minor stream about 25 to 40%.

In the partial combustion of a hydrocarbon gas such as methane to form a mixture comprising essentially carbon monoxide and hydrogen, it is necessary to maintain the temperature within the combustion zone above a minimum temperature in order to prevent the deposition of carbon during the process. The minimum temperature is dependent upon the reaction mixture, the pressure at which the oxidation is effected and the nature of the catalyst, if any. When the temperature falls below this minimum temperature in the combustion zone, carbon tends to accumulate on the refractory surface upon which conversion occurs or upon the catalyst surface if a catalyst is used to increase the reaction rate of conversion. Above this minimum temperature, any carbon which is formed by objectionable hydrocarbon oxidation or by hydrocarbon cracking which is associated with a reaction taking place at such an elevated temperature, does not accumulate as there is sufficient heat energy to effect the endothermic reactions by which the carbonaceous deposits are removed. For example, above about 1600° F. there is sufficient heat for the endothermic reactions illustrated below to take place:

$$C + H_2O \rightarrow CO + H_2$$

$$C + CO_2 \rightarrow 2CO$$

Under the most favorable conditions, which comprise employing a reaction mixture consisting of a mol of methane and a half-mol of molecular oxygen, effecting the combustion at atmospheric pressure in the presence of an alumina-supported nickel catalyst, the minimum temperature required to prevent carbon accumulation is about 1600° F. Under less favorable conditions, for example, employing the same reaction mixture and effecting combustion at about 250 lbs. per square inch pressure in the absence of a catalyst, the minimum temperature may be in the range of about 2,000 to 2,200° F. Thus it may be seen that operating conditions have a marked effect upon the value of the minimum temperature required to prevent carbon accumulation.

The conversion of methane with a limited amount of oxygen so as to produce carbon monoxide and hydrogen in the aforesaid ratio is not sufficiently exothermic to provide enough heat to maintain the reaction above the minimum temperature required to prevent carbon deposition if the reactants are introduced into the combustion zone at atmospheric temperature. Consequently, other means must be resorted to in order to maintain the reaction above 1600° F. Means by which the temperature in the partial combustion may be maintained above the minimum temperature, which is in the range of about 1600° F. under the most favorable conditions, are detailed in the following paragraphs.

A part of the methane may be completely oxidized to carbon dioxide and steam which is a highly exothermic reaction and provides sufficient heat to maintain the temperature above the desired level in order to prevent carbon deposition. This is wasteful in oxygen which is the most expensive reactant. Economical operation, using this method, requires reversion of the carbon dioxide and steam formed by complete combustion with additional methane in a separate stage; reversion of carbon dioxide and steam with methane to form carbon monoxide and hydrogen is a highly endothermic reaction and demands the input of considerable heat energy.

Another method of maintaining the combustion zone at a temperature above the desired level is to supply heat externally to the reactor wherein the combustion takes place. This mode of operation involves problems in heater design and construction in large-scale production of synthesis gas, particularly when the synthesis gas is prepared at elevated pressures, e. g., in the range of about 250 pounds per square inch.

A third method of maintaining the combustion zone at a temperature above the desired level is to preheat the reactants prior to their introduction into the combustion zone. By preheating the reactants to a sufficiently high temperature prior to their introduction into the combustion zone, the partial combustion of the preheated reactants provides sufficient heat to maintain the combustion zone above the minimum temperature required to prevent carbon accumulation. It is a method of preheating the reactants so as to maintain the temperature in the combustion zone above the desired level that forms the subject matter of this invention.

There are certain problems which are contingent to preheating which are solved by the method as disclosed in this invention. First, it is advisable to effect premixing of the reactants prior to their entry into the combustion zone in order to assure uniform and complete utilization of the hydrocarbon gas. Secondly, there is a limitation put on the temperature to which a combustible mixture such as methane and oxygen may be heated by the tendency of such as mixture to ignite spontaneously at elevated temperatures.

Stoichiometrically, the partial combustion of methane with oxygen to form carbon monoxide and hydrogen is represented by the following equation:

$$CH_4 + \tfrac{1}{2}O_2 \rightarrow CO + 2H_2$$

This shows that the partial combustion of methane to give exclusively carbon monoxide and hydrogen requires 0.5 mol of oxygen per mol of methane. There is danger of spontaneous ignition taking place in a mixture which comprises a mol of methane per one-half mol of oxygen if the mixture is preheated to a temperature sufficiently high to maintain the temperature in the combustion zone above the minimum temperature required to prevent carbon deposition. This is particularly true at superatmospheric pressures.

The deposition of carbon in a combustion furnace is deleterious because it not only cuts down the yield of carbon monoxide and hydrogen per unit of hydrocarbon gas, but it also in time necessitates a shut-down of the combustion furnace while the carbon is removed by oxidation or by some other method.

The preheating of the minor stream of oxygen undiluted with hydrocarbon has a limitation which is determined by the type of metal or alloy that is used for the tubes in which the preheating takes place. Thus, if carbon steel is employed for the fabrication of the metal tubes wherein the minor stream of oxygen is preheated, it is not feasible to preheat the oxygen over about 800° F., whereas if an alloy such as Hastelloy is used, it is possible to preheat the oxygen up to a temperature of about 1500° F., providing a small pressure differential is maintained between the interior and exterior of tubes in which oxygen is preheated.

The reduction of the percentage of oxygen in the combustible mixture by splitting the oxygen stream into a major and minor stream and only combining the major stream with the hydrocarbon gas allows the combustible mixture to be preheated to a higher temperature. The minimum temperature at which spontaneous ignition of a combustible mixture takes place increases as the percentage of oxygen in the combustible mixture decreases.

The combustible mixture of hydrocarbon gas and major stream of oxygen is passed through the preheater at such a rate that turbulent flow is effected. The maintenance of turbulent flow in the combustible mixture of the preheater wherein the mixture is heated provides thorough mixing of the major stream of oxygen and the hydrocarbon gas. The attainment of turbulent flow depends upon variable factors such as the diameter of the pipe and the viscosity of the gas stream. The realization of thorough mixing of the components of the combustible mixture in the preheater minimizes the problem of accomplishing efficient mixing in the furnace wherein the partial combustion of the hydrocarbon gas with the limited amount of oxygen is effected.

The homogeneous mixture of hydrocarbon gas and oxygen is introduced into the combustion zone wherein the conversion takes place in conjunction with the minor stream of oxygen so that thorough mixing of the two streams is obtained. As has been pointed out previously, thorough mixing of hydrocarbon gas and oxygen is necessary for uniform and complete utilization of the hydrocarbon gas. A number of schemes are available by which thorough mixing of the minor stream of molecular oxygen with the combustible mixture may be attained. One alternative is to position the nozzles through which the separate streams are introduced so that the two streams impinge one upon the other in cross-current flow and then are forced through an orifice. A plurality of concentric annular jets will also assure adequate mixing of the molecular oxygen with the combustible mixture. Another satisfactory alternative is to jet the combustible mixture into the furnace by means of molecular oxygen which has been raised to an elevated pressure.

It is advantageous to employ a catalyst in the combustion furnace in order to increase the rate at which partial combustion takes place. Nickel deposited on alumina is illustrative of the type of catalyst which may be used in the combustion furnace. The use of a catalyst makes it feasible to use a smaller combustion furnace and thereby minimize radiation losses so that it is easier to maintain the desired minimum temperature in the partial combustion.

The main advantage which results from effecting the partial combustion of a hydrocarbon gas with oxygen according to the method of this invention is that coke accumulation is prevented while still providing adequate mixing and minimum oxygen utilization in the partial combustion.

Another advantage is that increased yields of carbon monoxide and hydrogen are obtained per unit of hydrocarbon gas. A third advantage resides in the fact that the combustion furnace may be kept on stream for an indefinite period.

In order that the invention may be more fully understood, reference will now be made to a drawing wherein the method of flow of the invention is illustrated.

A hydrocarbon gas is obtained from a source not shown through a pipe 1. Ordinarily natural gas, whose main constituent is methane, is employed.

Molecular oxygen or a gas rich in molecular oxygen is obtained from a source not shown through a pipe 2. This gas ordinarily contains at least 75% molecular oxygen. Its usual source is the fractionation of liquefied air.

The proportions of methane and oxygen which flow along the pipes 1 and 2 are regulated so that there will be present in the furnace a mixture which contains enough oxygen for carbon monoxide and hydrogen in the molecular ratio of 1:2 to be formed by conversion. According to the equation:

$$CH_4 + \tfrac{1}{2}O_2 \rightarrow CO + 2H_2$$

a mixture containing 33 per cent molecular oxygen and 67 per cent methane is required stoichiometrically for the conversion to yield exclusively carbon monoxide and hydrogen.

The oxygen proceeds along the pipe 2 to a Y where it is divided into a major and minor stream. The major portion proceeds along a branch pipe 4 through which it is combined with the methane flowing through the pipe 1. This major stream constitutes from 55 to 85 per cent of the total oxygen required for partial combustion. Advantageously, this stream comprises 60 to 75 per cent of the total oxygen stream.

The combined methane and oxygen streams proceed along the pipe 1 and are introduced into a heater 6. In the heater this mixture is raised to a temperature of about 1000° to 1200° F. The attainment of this temperature is practicable because the oxygen content of the stream has been lowered. Adequate mixing of the constituents is assured by passing them through the preheater 6 at such a rate that turbulent flow prevails.

The preheated and homogeneous mixture of hydrocarbon gas and oxygen leaves the preheater 6 through a pipe 8 and proceeds therealong until it is introduced into an anti-chamber 10 of the furnace which serves the purpose of effecting thorough mixing of the minor oxygen stream and the mixture of oxygen and hydrocarbon gas.

The minor stream of molecular oxygen constituting 15 to 45 per cent of the total amount of oxygen employed in the combustion and preferably 25 to 40 per cent of the same passes along a pipe 11 from the Y intersection at which the total oxygen stream is divided into two components. Through the pipe 11, the minor oxygen stream is introduced into a preheater 14 which is of smaller dimensions than the preheater 6 in which the mixture of oxygen and hydrocarbon gas is preheated.

The temperature to which the oxygen stream is heated in the preheater 14 depends upon the fabrication of the pipes through which the oxygen is passed. Thus, if the pipes are constructed of ordinary carbon steel, the practical limit to which the oxygen may be preheated is about 800° F., whereas if a high temperature alloy such as Hastelloy is used, the oxygen may be preheated to about 1500° F., provided there is only a small pressure differential between the interior and exterior of the tube in which the oxygen is preheated. It is advantageous to employ a temperature-resistant alloy such as Hastelloy in order to utilize the higher sensible heat of the oxygen gas which is thereby made attainable.

The molecular oxygen leaves the preheater 14 through a pipe 15 at a temperature of about 1600° F., assuming that the pipes in the preheater 14 are constructed of a temperature-resistant alloy. The oxygen passes along the pipe 15 and is introduced into the mixing chamber 10.

The mixing chamber 10 illustrates one method of assuring adequate mixing of the oxygen stream with the mixture of oxygen and hydrocarbon gas. As mentioned previously, other means of mixing these two components may be employed.

The oxygen stream is introduced through the pipe 15 into the inner cone 16 of the mixer 10. The combustible mixture of methane and oxygen is split into two streams and proceeds along the pipes 17 and 18 so that it is introduced at two or more points into an annulus 20 surrounding the cone 16 in the mixer 10. The oxygen and the mixture of oxygen and methane converge and are thoroughly mixed in the refractory throat 21 of the furnace 22.

The furnace 22 is of the double wall type in which an outer wall 23 packed with a heat-resistant material serves to insulate the combustion zone. The numeral 24 designates the actual combustion zone which may be packed with catalyst or with refractory material.

After passage through the refractory throat 21, the gas mixture is homogeneous and undergoes conversion to form primarily a mixture of carbon monoxide and hydrogen in the combustion zone 24 of the furnace. Traces of carbon dioxide and steam are present in the effluent from the furnace. Ignition means, not shown, such as a spark plug, may be used to initiate the combustion.

By preheating the reactants in the manner just described, it is possible to maintain the temperature in the furnace 22 above the minimum required to prevent carbon deposition and at the same time assure complete and uniform utilization of the hydrocarbon gas by providing adequate premixing. The partial combustion is sufficiently exothermic to maintain the reaction temperature above the minimum when the reactants have been preheated to the temperature specified. The hydrocarbon gas is completely converted to carbon monoxide and hydrogen since such adequate premixing is provided.

The carbon monoxide and hydrogen which are formed by the conversion may be catalytically converted into hydrocarbons, oxygenated hydrocarbons and the like. Various well-known processes and various well-known catalysts, such as iron and cobalt, may be used to effect this catalytic conversion.

It is contemplated that catalysts other than nickel on alumina may be used in the furnace 22 to catalyze the partial oxidation of methane with oxygen. It is also contemplated that mere surface oxidation may be effected by filling the combustion zone 24 with a refractory material such as carborundum. In this latter instance, it will be necessary to maintain the temperature in the furnace at a higher level to prevent carbon deposition because the rate of reaction is slower without a catalyst.

Obviously many modifications and variations of the invention, as hereinbefore set forth, may be made without departing from the spirit and scope thereof and, therefore, only such limitations should be imposed as are indicated in the appended claims.

I claim:

1. In the continuous partial combustion of a hydrocarbon gas with a limited quantity of molecular oxygen sufficient to support incomplete combustion of the reactants to produce a maximum amount of carbon monoxide and hydrogen, the method which comprises dividing said limited quantity of molecular oxygen into major and minor streams, combining said major stream with a hydrocarbon gas, thereby forming a mixture of hydrocarbon gas and oxygen, raising said mixture to an elevated temperature, raising said minor stream of oxygen to an elevated temperature, separately passing said heated streams to a combustion zone, mixing said streams as they enter said combustion zone and effecting partial combustion of hydrocarbon gas and oxygen into products comprising mainly carbon monoxide and hydrogen.

2. The method according to claim 1 in which the hydrocarbon gas is methane.

3. The method according to claim 1 in which the mixture of hydrocarbon gas and oxygen is raised to an elevated temperature in the range of 1000 to 1200° F. before introduction into the combustion zone.

4. The method according to claim 1 in which the minor stream of oxygen is raised to a temperature in the range of 800° to 1500° F., prior to introduction into the combustion zone.

5. In the continuous partial combustion of a hydrocarbon gas with a limited quantity of molecular oxygen sufficient to support incomplete combustion of the reactants to produce a maximum amount of carbon monoxide and hydrogen, the method which comprises dividing said limited quantity of molecular oxygen into major and minor streams, said major stream comprising 55 to 85% of the total oxygen used in the partial combustion and said minor stream comprising 15 to 45% of said total oxygen, combining said major stream with a hydrocarbon gas, thereby forming a mixture of hydrocarbon gas and oxygen, raising said mixture to an elevated temperature, raising said minor stream to an elevated temperature, separately passing said heated streams to a combustion zone, mixing said streams as they enter said combustion zone and effecting partial combustion of hydrocarbon gas and oxygen into products comprising mainly carbon monoxide and hydrogen.

6. The method according to claim 5 in which the major stream preferentially comprises 60 to 75% of the total oxygen and the minor stream preferentially comprises 25 to 40% of the total oxygen used in the partial combustion.

7. In the continuous partial combustion of a hydrocarbon gas comprising methane with a limited quantity of molecular oxygen to form mainly carbon monoxide and hydrogen wherein the oxygen content of the total combustion mixture comprises 33 to 40% of the total reactants, the method which comprises dividing said limited quantity of molecular oxygen into major and minor streams, combining said major stream with a hydrocarbon gas, thereby forming a mixture of hydrocarbon gas and oxygen, raising said mixture to an elevated temperature, raising said minor stream to an elevated temperature, separately passing said heated streams to a combustion zone, mixing said streams as they enter said combustion zone and effecting partial combustion of hydrocarbon gas and oxygen into products comprising mainly carbon monoxide and hydrogen.

8. The method of converting hydrocarbon gas into carbon monoxide and hydrogen which comprises mixing hydrocarbon gas with molecular oxygen, said oxygen being substantially less than that amount of oxygen sufficient to support in complete combustion of the mixture with the production of a maximum amount of carbon monoxide and hydrogen, heating a stream of said mixture to an elevated temperature below that at which spontaneous ignition would occur, separately heating to elevated temperature another stream of molecular oxygen, sufficient when added to said first mentioned mixture to provide the theoretical amount of oxygen required for incomplete combustion of the hydrocarbon gas to produce the maximum amount of carbon monoxide and hydrogen, separately passing said heated streams to a combustion zone, mixing said streams at the inlet to said combustion zone, effecting substantial conversion of hydrocarbon gas into products comprising mainly carbon monoxide and hydrogen, and removing said products from the combustion zone.

9. The method according to claim 8 in which the hydrocarbon gas is methane.

10. The method according to claim 8 in which the mixture of hydrocarbon gas and molecular oxygen is raised to an elevated temperature in the range of 1000 to 1200° F. before introduction into the combustion zone.

11. The method according to claim 8 in which the separately heated molecular oxygen stream is raised to a temperature in the range of 800 to 1500° F. prior to introduction into the combustion zone.

12. The method of converting hydrocarbon gas into carbon monoxide and hydrogen which comprises mixing hydrocarbon gas with molecular oxygen, said oxygen comprising 55 to 85% of the total oxygen used in the conversion, heating a stream of said mixture to an elevated temperature below that at which spontaneous ignition would occur, separately heating to elevated temperature another stream of molecular oxygen, said stream comprising 15 to 45% of the total oxygen used in the conversion, said total oxygen comprising 25 to 33% of that required for complete combustion, separately passing said heated streams to a combustion zone, mixing said streams at the inlet to said combustion zone, effecting substantial conversion of hydrocarbon gas into products comprising mainly carbon monoxide and hydrogen, and removing said products from the combustion zone.

13. In the continuous partial combustion of a hydrocarbon gas with a quantity of molecular oxygen approximating the stoichiometric proportion for incomplete combustion of the hydrocarbon gas to form hydrogen and carbon monoxide, the steps which comprise mixing said hydrocarbon gas with a portion of said quantity of molecular oxygen having a spontaneous ignition temperature substantially above that corresponding to a mixture of the hydrocarbon gas with the total quantity of oxygen, preheating said mixture to an elevated temperature below that at which spontaneous ignition occurs, separately preheating the remaining portion of said oxygen to an elevated temperature, separately passing said preheated streams to a combustion zone, mixing said streams in said combustion zone, effecting substantial conversion of hydrocarbon gas into products comprising mainly carbon monoxide and hydrogen and recovering said products from the combustion zone.

14. The method according to claim 13, wherein said hydrocarbon gas comprises essentially methane.

15. The method of converting a hydrocarbon gas to produce a maximum yield of carbon monoxide and hydrogen which comprises heating to an elevated temperature above about 1000° F., an intimately mixed stream of said hydrocarbon gas and molecular oxygen, maintaining the proportion of oxygen in the mixture below that value at which spontaneous ignition will occur at the said temperature of preheat, separately preheating an additional stream of oxygen sufficient in combination with the oxygen contained in said mixed stream to support incomplete combustion of the hydrocarbon gas with the formation of a maximum amount of carbon monoxide and hydrogen, separately passing said preheated gases to a combustion zone, effecting substantial conversion of hydrocarbon gas into products comprising mainly carbon monoxide and hydrogen, and recovering said products from the combustion zone.

LEON P. GAUCHER.

REFERENCES CITED

The following references are of record in the file of this patent:

FOREIGN PATENTS

| Number | Country | Date |
|---|---|---|
| 247,176 | Great Britain | Feb. 8, 1926 |
| 349,471 | Great Britain | May 26, 1931 |